United States Patent
Fort (10) Patent No.: US 10,637,642 B2
(45) Date of Patent: Apr. 28, 2020

(54) ROBUST RADIO PACKET ACQUISITION IN THE PRESENCE OF CONTINUOUS WAVE INTERFERENCE

(71) Applicant: Qorvo International PTE. LTD., Singapore (SG)

(72) Inventor: Andrew Fort, Kessel Lo (BE)

(73) Assignee: Qorvo International PTE. LTD., Singapore (SG)

( * ) Notice: Subject to any disclaimer, the term of this patent is extended or adjusted under 35 U.S.C. 154(b) by 0 days.

(21) Appl. No.: 16/311,427

(22) PCT Filed: Jun. 28, 2016

(86) PCT No.: PCT/NL2016/050455
§ 371 (c)(1),
(2) Date: Dec. 19, 2018

(87) PCT Pub. No.: WO2018/004332
PCT Pub. Date: Jan. 4, 2018

(65) Prior Publication Data
US 2019/0238309 A1    Aug. 1, 2019

(51) Int. Cl.
*H04L 7/04* (2006.01)
*H04L 27/26* (2006.01)
(Continued)

(52) U.S. Cl.
CPC .......... *H04L 7/042* (2013.01); *H04B 1/7075* (2013.01); *H04L 27/2663* (2013.01);
(Continued)

(58) Field of Classification Search
CPC . H04L 7/042; H04L 27/2663; H04L 27/2671; H04L 27/2675; H04J 3/0608; H04J 3/0605; H04B 1/7075
See application file for complete search history.

(56) References Cited

U.S. PATENT DOCUMENTS 5,831,981 A    11/1998   Tanimura et al.
8,014,379 B2    9/2011   Capretta et al.
(Continued)

FOREIGN PATENT DOCUMENTS

EP    1217781 A1    6/2002

OTHER PUBLICATIONS

Author Unknown, "Core System Package: Low Energy Controller Volume," Specification of the Bluetooth System, vol. 6, Version 5.0, Dec. 6, 2016, 263 pages.
(Continued)

*Primary Examiner* — Sung S Ahn
(74) *Attorney, Agent, or Firm* — Withrow & Terranova, P.L.L.C.

(57) ABSTRACT

Method and receiver for acquiring a data packet in a signal transmission like Bluetooth Low Energy (BLE), wherein the data packet comprises a preamble code (2) followed by an access code (3) and has a symbol period. The following steps are executed: —executing a preamble correlation (8) continuously on a received signal (10) using the preamble code (2); —determining a frequency estimate (14) and a timing estimate (13) from the preamble correlation (8); —using the frequency estimate (14) to execute a frequency correction (15) on the received signal; —performing an access code correlation (9) on the frequency corrected received signal, in parallel with the continuous execution of the preamble correlation (8); and —detecting a data packet (19) when the access code correlation (9) is higher than a predetermined access code threshold (18) at an expected time relative to the timing estimate (13). Thereby packet loss due to false detection is minimized since the preamble correlation is continuously performed even when peaks are detected. Furthermore the frequency estimate obtained from the pre-
(Continued)

amble correlation is used to reduce the complexity of the access code correlation.

22 Claims, 3 Drawing Sheets

(51) Int. Cl.
*H04B 1/7075* (2011.01)
*H04J 13/00* (2011.01)

(52) U.S. Cl.
CPC ...... *H04L 27/2671* (2013.01); *H04L 27/2675* (2013.01); *H04J 13/00* (2013.01)

(56) References Cited

U.S. PATENT DOCUMENTS

| | | |
|---|---|---|
| 8,531,981 B2 | 9/2013 | Van Driest et al. |
| 2005/0089083 A1 | 4/2005 | Fisher et al. |
| 2007/0127606 A1* | 6/2007 | Ueng ..................... H04L 7/042 375/343 |
| 2009/0245428 A1* | 10/2009 | Yang .................. H04L 27/0014 375/330 |

OTHER PUBLICATIONS

Pfletschinger, Stephan, et al., "Frame Synchronization for Next Generation Uplink Coding in Deep Space Communications," IEEE Global Communications Conference, Dec. 6, 2015, 6 pages.

Schaub, T., "Improved Binary Frame Synchronization Scheme for Packet Transmission," Electronics Letters, vol. 24, Issue 6, Mar. 1988, IEEE, 2 pages.

International Search Report and Written Opinion for PCT/NL2016/050455, dated Mar. 21, 2017, 14 pages.

International Preliminary Report on Patentability for PCT/NL2016/050455, dated Jan. 10, 2019, 9 pages.

* cited by examiner

ROBUST RADIO PACKET ACQUISITION IN THE PRESENCE OF CONTINUOUS WAVE INTERFERENCE

This application is a 35 USC 371 National Phase filing of International Application No. PCT/NL2016/050455, filed Jun. 28, 2016, the disclosure of which is incorporated herein by reference in its entirety.

FIELD OF THE INVENTION

The present invention relates to a method for acquiring a data packet in a signal transmission, wherein the data packet comprises a preamble code followed by an access code and has a symbol period.

BACKGROUND ART

U.S. Pat. No. 8,531,981 discloses an arrangement for determining a characteristic form of an input signal having a preamble signal. Frequency offset and timing offset can be determined using a cross correlation scheme wherein a known preamble is cross correlated with a received preamble.

U.S. Pat. No. 8,014,379 discloses a circuit for processing a packet based signal received over a Bluetooth radio link. The circuit uses a detection scheme with correlation of a (part of) an access code for synchronization purposes.

SUMMARY OF THE INVENTION

The present invention seeks to provide a method that achieves nearly the same continuous wave interference robustness as a single correlation against the entire access code without significantly increasing the hardware complexity.

According to the present invention, a method as defined above is provided, wherein the method comprises:
executing a preamble correlation continuously on a received signal using the preamble code;
determining a frequency estimate and a timing estimate from the preamble correlation;
using the frequency estimate to execute a frequency correction on the received signal;
performing an access code correlation on the frequency corrected received signal, in parallel with the continuous execution of the preamble correlation;
detecting a data packet when the access code correlation is higher than a predetermined access code threshold at an expected time relative to the timing estimate.

The continuous execution of the preamble correlation ensures that no data packet can be missed in the received signal processing. The frequency estimate is used to prevent having to use large number of parallel access code correlations as in many prior art methods. Furthermore this embodiment allows implementations with an efficient hardware utilization.

In a further embodiment, executing a preamble correlation comprises performing a peak detection, selecting a candidate peak if the peak detection rises above a predetermined peak threshold and subsequently falls below the predetermined peak threshold within a time period of approximately one symbol period. This effectively discerns an actual presence of a preamble (i.e. a data packet) over continuous wave interference, and thus provides an excellent robustness against continuous wave interferers.

The access code correlation is executed using a sub-sequence part of the access code in an even further embodiment, which further aids in reducing resources needed to implement the present invention method.

Various embodiments for selecting the sub-sequence part are provided by the present invention. A score is attributed in one embodiment to possible sub-sequence part candidates by comparing a possible sub-sequence part candidate to previous bit sequences in the access code. E.g. a code separation from the preamble part and/or possible further sub-sequence parts can be calculated, and used as a measure for selecting a specific sub-sequence part. Proper selection can provide a cost-effective solution with a robust detection and good performance against possible interferers.

In a further aspect, the present invention relates to a receiver for receiving a data packet in a signal transmission, comprising receiver circuitry to receive the signal transmission and a processor connected to the receiver circuitry, wherein the processor is arranged to execute the present invention method embodiments. A cost effective solution for a robust receiver can then be provided.

SHORT DESCRIPTION OF DRAWINGS

The present invention will be discussed in more detail below, with reference to the attached drawings, in which.

DETAILED DESCRIPTION

Bluetooth Low Energy (BLE) is emerging as one of the important radio technologies enabling the internet of things and home automation. However, BLE will only serve to compliment and co-operate with existing house-hold radio systems. For example ZigBee exists already in set-top boxes and can be configured to provide coverage over an entire home via its low power mesh networking capabilities. BLE will compliment this service providing the user with the ability to easily control smart home functions from their smartphone. In addition, traditional services such as Wi-Fi, wireless remote control systems, and wireless telephone systems will continue to play a huge role in the home radio environment.

At the same time, BLE home automation radio systems will be found both in smart phones and a wide variety of home automation device nodes such as light bulb switches and sensor devices. For flexibility and ease of installation, these radio systems will operate on small coin cell batteries. Thus, any BLE radio system geared towards home automation will need to function properly in a radio environment with significant interference from other systems, and it will need to achieve this at low-cost and using low-power techniques.

Bluetooth Low Energy (BLE) home automation systems, but also other data communication systems using similar data packet transmissions, will need to operate robustly in an environment full of continuous wave radio interference. Continuous wave (CW) interference arises when a source continuously emits over a limited range of frequencies and with unintentional radiators. Examples of CW interferers in the household may include other wireless narrowband radios, micro-wave ovens, televisions, and personal computers. This is a particularly important source of radio interference since the regular repeated signal of a CW interferer may resemble the desired BLE signal resulting in false detections and impaired performance.

Traditional radio systems detect BLE packets by looking for a known 8 symbol preamble followed by detection of a unique 32 symbol access address. Detection of the 8 symbol preamble is typically achieved using some variant of an auto-correlation technique or a cross-correlation technique.

The auto-correlation technique takes advantage of the fact that the BLE preamble contains a repeating "10101010" or "01010101" bit pattern. Thus, by correlating incoming data with itself delayed by e.g. a 2 symbol period, the result will have a larger value when the preamble is present compared with noise. The magnitude of the auto-correlation can be used to provide a timing estimate, while the phase can be used for a frequency estimate. While this approach is very low power, continuous wave interferers also tend to have a repeating pattern causing a large number of false detection errors.

The cross-correlation technique correlates the known preamble against the received preamble. While this is a more accurate synchronization technique than auto-correlation, it comes at a much higher cost since the frequency offset between the transmitter and receiver crystals is unknown. This requires performing the cross-correlation at multiple frequency offsets. Furthermore, in the case of BLE, this approach is not necessarily more robust to continuous wave interference. BLE's repeating "01010101" and "10101010" preamble, when modulated with BLE's specified GFSK scheme, also correlate well with pure sine waves making it susceptible to false detections from interfering narrowband systems.

To recover from these false detections, each packet has a unique 32 symbol access address transmitted after the preamble which is known by the receiver (the preamble plus access address (or access code) forming a synchronization word, or sync word). In most cases, the receiver begins detecting these symbols after a potential packet has been found. In the event of a false detection, the decoded symbols will not align with the known address causing the receiver to abort the packet and re-start the packet detection process. While this substantially improves performance in interfering environment, it is still possible to miss packets if they arrive while the receiver is detecting symbols due to a false detection.

For this reason, most vendors incorporate the access address as part of the synchronization process directly to improve accuracy and avoid false detections altogether. The preamble can be "lengthened" to include a substantial portion of the access code. The access code is chosen randomly so will often have a different sequence from the preamble which does not correlate well with continuous wave interference. This is certainly an effective approach but it suffers from substantially increased computational complexity and area. The complexity and area of a BLE transceiver chip is increased due to the fact that the correlation against the known preamble is lengthened. Furthermore, due to the increased observation time, the number of frequency offsets in the cross-correlation algorithm also must be scaled accordingly. Finally, since the access codes are chosen at random, all possible access correlation coefficients must be stored or generated.

Figure 1:
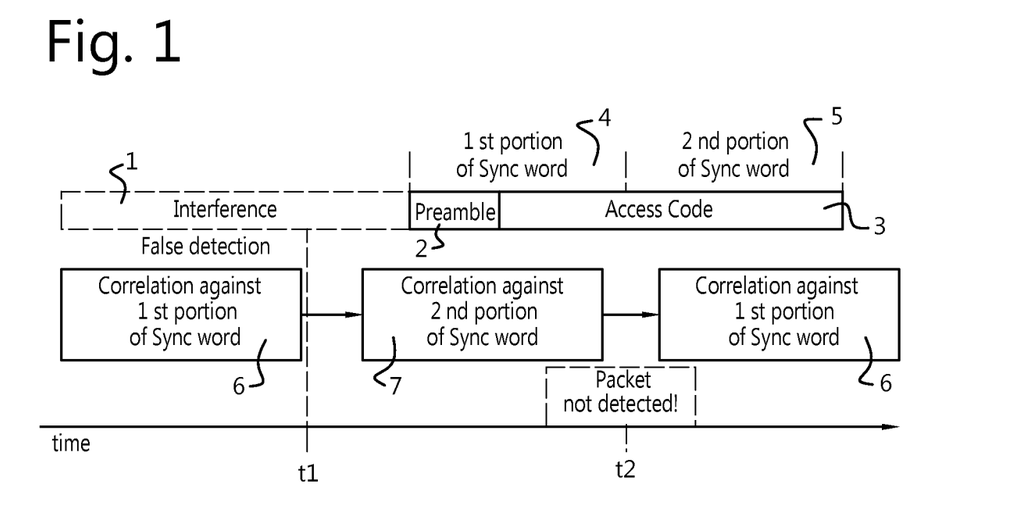
FIG. 1 shows a timing diagram of a prior art data packet detection method.

To reduce complexity, some vendors will perform two shorter correlations 6, 7 with a first portion of the sync word 4 and a second portion of the sync word 5 (or with some portion of the access code and a header located elsewhere in the packet). This solution is shown schematically in FIG. 1, depicting on the top line the presence of interference 1, a preamble 2 of the received packet, directly followed by the access code 3, in a received data packet signal.

The two shorter correlations are typically done serially so the same hardware can be re-used for both correlations. In most cases, the second correlation is designed to refine frequency and timing estimate made during the first correlation. While two shorter serial correlations can reduce hardware area and power, the interference robustness is often limited by the performance of the first correlation as demonstrated in FIG. 1. In the exemplary situation depicted, interference 1 causes a false detection at time $t_1$ on the first correlation 6. As a consequence, a packet can be missed while the same hardware is busy with the second correlation 7 (indicated as 'packet not detected at time $t_2$). This situation occurs quite frequently in practical BLE systems since many radio systems available on the market transmit CW interference prior to the packet itself. This interference stems from sinusoidal transmissions prior to the preamble and access code while the power amplifier and frequency synthesizer RF hardware settles to within the standard requirements.

Thus, the prior art systems and solution are either computationally complex or not fully robust to the type of CW interference typically encountered in BLE home automation radio environments.

Figure 2:
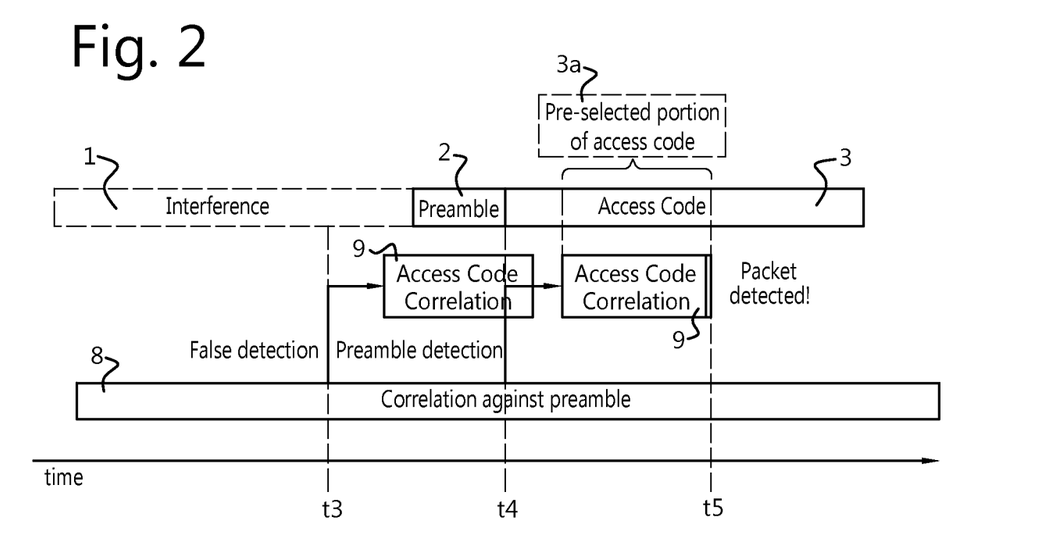
FIG. 2 shows a timing diagram of a data packet detection method according to an embodiment of the present invention.
Figure 3:
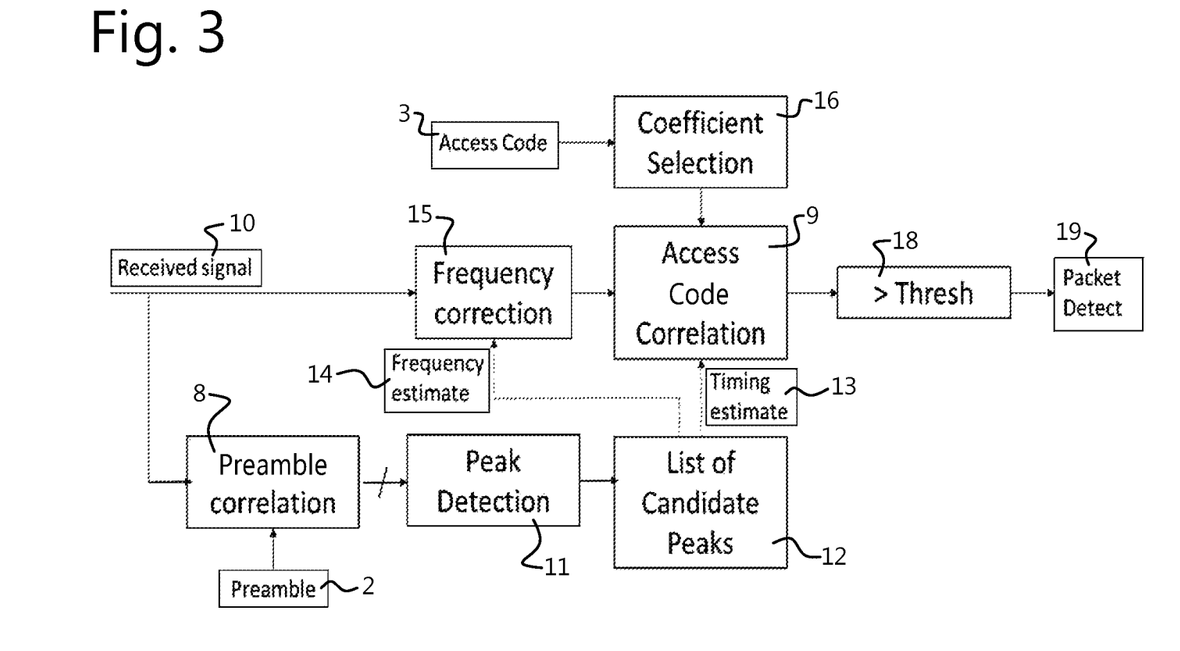
FIG. 3 shows a schematic diagram of functional blocks implementing the method according to an embodiment of the present invention.

According to the present invention embodiments, a method is provided for acquiring a data packet in a signal transmission, wherein the data packet comprises a preamble code 2 followed by an access code 3 and has a symbol period. The following steps are performed, as shown schematically in FIG. 2 and FIG. 3:

executing a preamble correlation 8 continuously on a received signal 10 using the preamble code 2;

determining a frequency estimate 14 and a timing estimate 13 from the preamble correlation 8;

using the frequency estimate 14 to execute a frequency correction 15 on the received signal;

performing an access code correlation 9 on the frequency corrected received signal, in parallel with the continuous execution of the preamble correlation 8;

detecting a data packet 19 when the access code correlation 9 is higher than a predetermined access code threshold 18 at an expected time relative to the timing estimate 13.

In a further aspect, the present invention relates to a receiver for receiving a data packet in a signal transmission, comprising receiver circuitry to receive the signal transmission and a processor connected to the receiver circuitry, wherein the processor is arranged to execute the method according to any one of the method embodiment described herein.

A (conventional) preamble correlation 8 against the known preamble code 2 is continually active to detect the packet. While this preamble correlation 8 could be done against a combination of the preamble and some portion of the access code, using the fixed preamble can reduce memory and hardware complexity in the context of BLE since it is the same for every packet while the access code can be different for every packet. Thus, in one embodiment, the data packet is a Bluetooth data packet, i.e. the preamble code 2 is a BLE data packet 8 symbol preamble code '01010101'. As an alternative, the preamble code 2 as used in the description of the present invention embodiments, may comprise the actual preamble sequence as used in the data packet to be received, in combination with a first part of the access code 3 as present in the data packet to be received.

If an interferer (interference 1 as indicated in FIG. 2) arrives which happens to correlate well with the preamble code 2 causing a false detection (indicated at time $t_3$ in FIG. 2), a second correlation labelled access code correlation 9, is then performed in parallel. As indicated, this access code correlation 9 may be performed using a predetermined portion 3$a$ of the access code 3, as will be explained in relation to further embodiments described below.

If this second correlation 9 is above a predetermined threshold, then a packet is detected and symbol-by-symbol detection can begin based on the timing and frequency offset information from the original preamble correlation peak. Unlike the closest prior art, a packet arriving shortly after this interference induced false detection at time $t_3$ is still detected since the correlation against the preamble continues in parallel, resulting in the preamble detection at time $t_4$ indicated in FIG. 2, followed by a proper packet detection at time $t_5$ by a new access code correlation 9 following the preamble detection at time $t_4$.

Typically, such a parallel solution would require doubling the hardware resulting in an unacceptable power and area penalty. To reduce this hardware increase, according to the present invention embodiments, the access code correlation 9 is only performed for the frequency and time estimated by the preamble correlation 8. In other words, the frequency estimate 14 resulting from the preamble correlation 8 is used to prevent having to use large number of parallel access code correlations.

It is noted that the preamble correlation 8 is implemented as a cross-correlation using the known preamble code 2 in one specific embodiment. In an alternative embodiment, an auto-correlation may be used to implement the preamble correlation 8. Since in this alternative embodiment the preamble code 2 contains a repeating pattern with a 2 symbol period, the received signal 10 could be correlated against a 2, 4, or 6 symbol delayed version of itself to obtain timing and frequency estimates 13, 14. The resulting output would be sent to a peak detection block 11 (see FIG. 3). Any peaks found in the auto-correlation function correspond to timing estimates 13, while the angle information can be used as a frequency estimate 14 for the list of candidate peaks. Such an approach is less accurate than the cross-correlation implementation, but substantially reduces complexity.

As shown in the diagram of FIG. 3, in the case of a cross-correlation implementation, peak detection 11 is used after the preamble correlation 8, which peak detection 11 then provides an estimate of the frequency offset 14 which can then be compensated. This avoids requiring a bank of access code correlators at different frequencies greatly reducing the power and area of the parallel implementation of access code correlation 9. Power is further reduced because a timing estimate 13 is available from the first correlation 8 so that the access code correlation 9 only needs to be active for a short time period related to the accuracy of the initial estimate.

During the packet detection process of the present invention embodiments, the received signal 10 is continuously correlated against the preamble code 2 (in block 8) at several frequency offsets. Whenever a peak in the correlation is found, an address code correlation 9 will be performed against the access code 3 at the appropriate frequency and time offset relative to the correlation peak. This address code correlation 9 is used to determine whether the initial peak was caused by an actual data packet header with a preamble code 2 and an access code 3 or by continuous wave interference 1.

Figure 4:
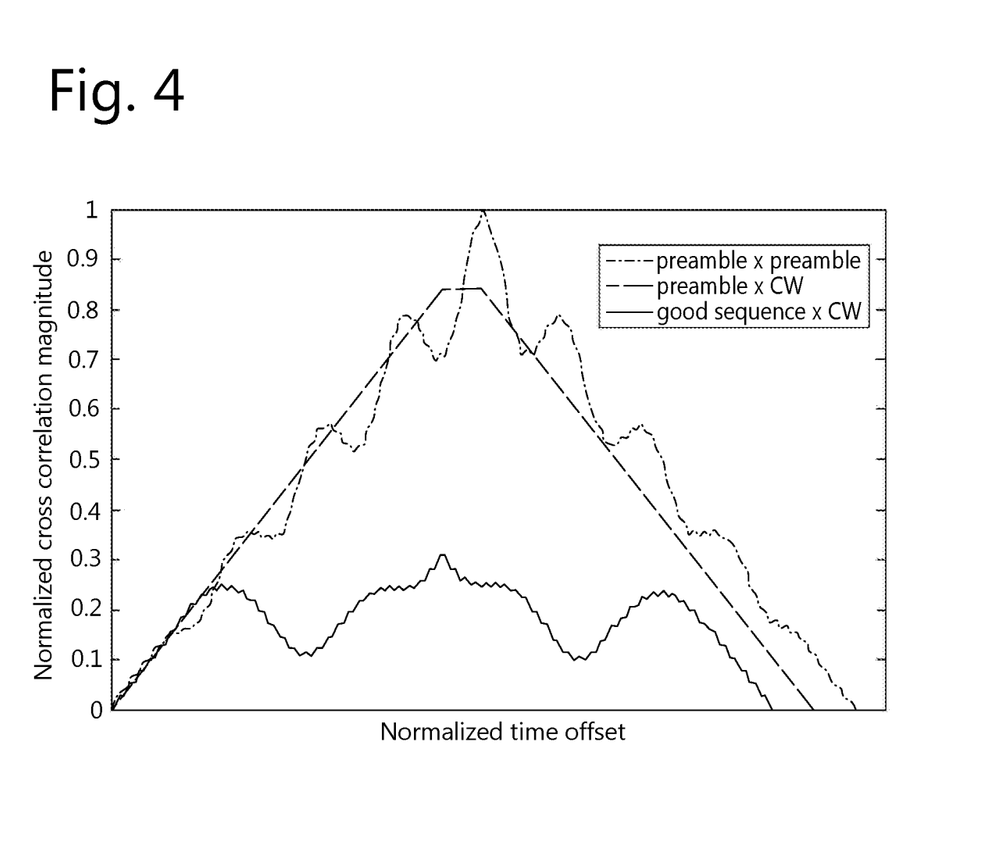
FIG. 4 shows cross-correlation graphs of various codes used in the present invention embodiments.

FIG. 4 shows the magnitude of a cross-correlation function of the 8-symbol preamble code 2 ("01010101") with itself (dash dot line), as well as a cross-correlation function of the preamble code 2 with a continuous wave interferer (dashed line). In this example, the preamble codes 2 and sequences have been modulated by BLE's specified GFSK BT=0.5 modulation. For simplicity, it was assumed that all of these signals are at the same frequency and downconverted to baseband. Having the interferer at the same frequency as the expected template of the receiver typically represents the worst-case with the highest chance of false detection. The y-axis shows the magnitude of the correlation, while the x-axis shows the timing lag, which has been expressed as normalized time offset. In the centre of the graph, the sequences are perfectly aligned yielding the largest result, while shifts to the left and right of the maximum represent some misalignment between the template and the received signal. (Due to some practical reasons the curves are not fully symmetrical around the same x-axis position, but for the description herein as such this is not relevant.)

As expected, the dash dot curve results in the highest cross-correlation (normalized to 1) as the preamble pattern is cross-correlated with itself. We can also see that cross-correlating the preamble with itself results in a signal with clear minimums and maximums each symbol. This is due to the 2 symbol period of the preamble pattern.

The dashed line is nearly as a high as the dash dot line since continuous wave interference looks very similar to BLE's "01010101" modulated preamble 2 pattern. In the presence of noise and other non-idealities, this can lead to numerous false detections. In contrast to the upper dash dot line, correlation against a sine-wave is a smooth signal with no minima and maxima.

In an exemplary embodiment, executing a preamble correlation 8 comprises performing a peak detection 11, and selecting a candidate peak if the peak detection rises above a predetermined peak threshold and subsequently falls below the predetermined peak threshold within a time period of approximately one symbol period. This effectively discerns an actual presence of a data packet over continuous wave interference.

Continuous wave interference will typically rise above the preamble correlation threshold since it looks so similar to the preamble code (see again FIG. 4Fout! Verwijzingsbron niet gevonden.). However, it will remain at a nearly constant value above the threshold until the continuous wave interference source is removed. In contrast, the repeating "10101010" pattern of an actual BLE preamble code 2 will reach a maximum when it is aligned with the received signal, but will reach a minimum one symbol later where it is poorly correlated with the expected pattern. Thus, incorporating the above elements in the peak definition further helps to distinguish between preambles and continuous wave interference.

The preamble correlation 8 is executed continuously in all present invention embodiments, and a list of candidate peaks 12 is stored with associated timing and frequency estimates 13, 14 as shown in the schematic diagram of FIG. 3. The preamble correlation 8 is done continuously, even after a peak has been detected. Thus, it is possible to find several "candidate" peaks which could potentially correspond to an actual packet and the hardware implementation thus stores a list of these candidate peaks 12. Each time a new peak is found, its timing and frequency estimate 13, 14 is recorded in the list as well. A subsequent access code correlation 9 will be performed for each recorded peak until a sufficiently high access code correlation has been found. If the access code correlation is too low, the corresponding peak is removed from the list of candidate peaks 12.

It is possible that there will still remain candidate peaks in the list of candidate peaks 12 even after one of the peaks has a sufficiently high access code correlation result (and thus a data packet has been detected. In one embodiment, the access code correlation 9 is executed for one or more (e.g. each) candidate peaks in the list 12 until detection of a data packet 19.

After a data packet has been detected (due to a peak in the preamble correlation 8 and a corresponding large result from the access code correlation 9, it is advantageous to synchronize using the timing and frequency estimate 13, 14 associated with the latest peak still in the list of candidate peaks 12 having at least a predetermined (reasonable) amplitude. The predetermined amplitude is e.g. at least 75%, e.g. at least 90% of a peak amplitude where the packet was detected. As peaks from the list of candidate peaks 12 are removed every time the access code correlation 9 result is too low, every peak remaining in the list of candidate peaks 12 will either have passed the access code test or have not yet been tested using the access code correlation 9. This embodiment has the advantage of better recovery from false detection errors resulting in better performance.

It is noted that a preamble pattern can exist in the middle of the access code 3, and, consequently this embodiment is to be applied only when the access code 3 (known to the receiver) does not contain the preamble code 2.

The access code correlation 9 is done on frequency compensated data (block 15 in FIG. 3) based on the preamble cross-correlation result (i.e. timing estimate 13 and frequency estimate 14). This avoids performing parallel access code correlations at several different frequency offsets, greatly reducing the required hardware power and area. In the event that several peaks with different frequency offsets are present in the list of candidate peaks 12, only the frequency corresponding to the largest peak is used as this typically corresponds to the correct frequency offset. When a data packet header with parts 2 and 3 is present in the received signal 10, the frequency of all the peaks in the list tend to be approximately the same so this does not impact performance.

In principle, only a single correlation computation is needed at the expected place in the access code 3 because the correlation peak contains the timing synchronization information. In practice, better performance is achieved by performing the access code correlation 9 at a few samples before and after the expected time of arrival of the selected access code due to the error variance of the timing estimate 13.

A further aspect of the present invention embodiments can be seen in the selection of a short sub-sequence 3a of the access code 3, which e.g. has a large code separation from the preamble code 2. A method is thus provided for acquiring a data packet in a signal transmission, wherein the data packet comprises a preamble code 2 followed by an access code 3 and has a symbol period, wherein the method comprises performing an access code correlation 9, and detecting a data packet 19 when the access code correlation 9 is higher than a predetermined access code threshold 18, and wherein the access code correlation 9 is executed using a sub-sequence part 3a of the access code 3.

It was found that only a short sub-sequence 3a of the access code 3 is required for robust continuous wave interference performance further reducing power and area. In one specific embodiment, the access code 3 has a 32 symbol length, and the sub-sequence part 3a has a symbol length between 5 and 9 symbols. Alternatively or additionally, the sub-sequence part 3a has a symbol length equal to or less than the preamble code 2 symbol length. The length of the sub-sequence part 3a is equal to or smaller than an 8 symbol length in the case of BLE, e.g. a 5 symbol length.

Referring again to the diagram of FIG. 4, the lower solid curve shows the cross correlation function of an 8 symbol "01110001" sequence with a continuous wave interferer. This indicates that as long as correlation is executed against a carefully-chosen sub-sequence part 3a of the access code 3, it does not need to be any longer than the preamble code 2 (8 symbols long). Thus, correlation against the entire 32 symbol access code 3 is not necessary to obtain a reliable distinction between continuous wave interference and an actual data packet.

In fact, the sub-sequence part 3a only needs to be a few symbols long if it is carefully selected to have a large enough code separation from the preamble code 2, e.g. the sub-sequence part 3a of the access code 3 is selected to have a code separation from the preamble code 2 higher than a predetermined first code separation threshold. The code separation can be evaluated using e.g. a cross correlation calculation. Furthermore, the sub-sequence part 3a of the access code 3 may be selected to have a code separation from further possible sub-sequence parts of the preamble code 2 and the access code 3 preceding the sub-sequence part 3a higher than a predetermined second code separation threshold.

During a BLE connection phase, the access code 3 is a 32 symbol pattern chosen at random by the master device and communicated to the slave device (receiver). Upon receiving its access code 3, the slave device then selects a sub-sequence part 3a with an appropriate length L to perform the additional access code correlation 9. The value of L is typically chosen to be between 5 and 9 symbols. An actual packet will have a high correlation against the preamble code 2 and a high correlation against the selected sub-sequence part 3a of the access code 3. On the other hand, a continuous wave interferer will have a high correlation against the preamble code 2 but a low correlation against the selected sub-sequence part 3a of the access code 3.

In further embodiments, two criteria may be used in selecting the best sub-sequence part 3a from the access code 3, i.e. a high code separation with the preamble code 2, and a high code separation with previous sub-sequences in the access code 3.

A high code separation is understood to mean that the two sequences are "not similar" or that they have a low cross-correlation coefficient with each other. The rationale for the first property is that a continuous wave interferer that correlates well with the preamble code 2 will correlate poorly at the same frequency with a sub-sequence part 3a which is completely different from the preamble code 2. The second property is also important to avoid cases where interference just prior to the arrival of the data packet causes a false detection with the preamble code correlation 8. If there is a (sub-)sequence occurring earlier in the access code 3 which has a low code separation from the selected sub-sequence part 3a, the access code correlation 9 may also fail resulting in a dropped packet.

A generic approach may include the following steps: A random access code 3 is assigned for a connection by a master device. A first score is assigned for each sub-sequence part 3a with length L proportional to the code separation between the sub-sequence part 3a and the preamble code 2. In parallel, a second score is assigned for each sub-sequence part 3a with length L proportional to the code separation between the sub-sequence part 3a and previous sub-sequences occurring in the access code 3. A sub-sequence part 3a is then selected where the first score is above a predetermined first code separation threshold, and the second score is above a predetermined second code separation threshold.

One possible implementation of this generic approach would be to use pre-computed tables containing all possible length L bit patterns (sub-sequence parts 3a) together with a predetermined first score reflecting its code separation from the preamble code 2 and pre-computed second score reflecting its code separation with all other length L bit patterns. This is accomplished in a further embodiment, wherein the code separations for possible sub-sequence parts 3a are calculated for a plurality of access codes 3 and stored in a look-up table.

Alternatively, a simple algorithm may be used based on the bit patterns to assign the first and second scores. This algorithm is typically simple enough to fit easily into available code memory and be executed by non-real time software.

For computing the first score proportional to the code separation between preamble code 2 and the sub-sequence part 3a, an algorithm taking the following goals into account achieves excellent performance in practice: Select a sub-sequence with the fewest bit transitions, avoid all "1" or all "0" patterns, and avoid long sequences of 1's and 0's at the beginning and ending of the sub-sequence part 3a.

As the preamble code 2 has a "01010101" or "10101010" repeating pattern with a maximum number of 1-0 transitions, scoring a bit pattern with the fewest transitions results in good performance. For example, the bit pattern "11111010" performs better than "11101010". On the other hand, a long string of 1+s and 0's with no transitions at all should also be avoided (second goal) because this is a pure sinusoid that looks exactly like continuous wave interference at particular frequency offsets from the packet. Due to the memory in the BLE modulation, best results were observed if the string of repeated symbols occurs in the middle of the sub-sequence part 3a rather than at the start or end (third goal). For example, sequence "1011101" is significantly better than sequences "1110101" and "1010111" even though it has the same number of bit transitions.

A simple algorithm e.g. includes the following decision steps:

First, the number of adjacent bits is calculated. For example, the bit-pattern "10101010" has no adjacent bits that are the same and would be assigned a score of 0. On the other hand, the bit pattern "11001110" has 4 adjacent bits which are the same (goal 1). If the resulting score is greater than or equal to L−1, we reduce the score to 2. This discourages the algorithm from selecting long strings of "1" and "0" bits with almost no transitions (goal 2). Otherwise, 0.1 times the number of adjacent bit patterns found at the start or end of the sequence (goal 3) are subtracted. For example, the bit pattern "11010101" would have a score of 0.9, while the pattern "01101010" would have a score of 1.

For computing the second score proportional to the code separation between the sub-sequence part 3a with length L and previous sub-sequences with length L in the access code 3, an algorithm assigning scores based on the following rules provides excellent performance:

Exactly the same bit pattern has the lowest score (no code separation);
The same bit pattern except for the first or last bit has the second lowest score;
The same bit pattern except for the first two or last two bits has the third lowest score;
The same bit pattern with a single bit reversal has the fourth lowest score;
All other bit patterns are given a score greater than the threshold (sufficient code separation).

This is implemented in a further embodiment, wherein a score is attributed to possible sub-sequence part 3a candidates, wherein:

a sub-sequence part 3a candidate having an identical bit sequence obtains a lowest score;
a sub-sequence part 3a candidate having an identical bit sequence deviating only in the first or last bit obtains a second lowest score;
a sub-sequence part 3a candidate having an identical bit sequence deviating only in the first or last two bits obtains a third lowest score;
a sub-sequence part 3a candidate having an identical bit sequence deviating only in one bit reversal of adjacent bits obtains a fourth lowest score; and
a sub-sequence part 3a candidate having a different bit sequence from the ones above obtains a score above a score threshold value;

wherein the sub-sequence part 3a candidate having a score above the score threshold value is selected or the sub-sequence part 3a candidate having the highest score is selected as the sub-sequence part 3a.

In a more generic embodiment, a score is attributed to possible sub-sequence part 3a candidates by comparing a possible sub-sequence part candidate to previous bit sequences in the access code 3. In this embodiment, a place in the access code 3 is selected to correlate against (the sub-sequence part 3a) simply by looking at the bit sequence contained in the access code (3).

Since the access code 3 is selected at random, it may still seem possible to have some access codes 3 with all poor sub-sequence parts 3a where one or both of the scores are below an acceptable threshold level. For example, if the entire access code 3 contains nothing but "1010 . . . " transitions, the access code correlation 9 would also resemble the preamble code 2 causing the algorithm to fail. However, the BLE standard has rules regarding the construction of random access codes which guarantees that at least some adjacent bits will be the same. Thus, the probability of having a very poor access code 3 which is not significantly different from the preamble code 2 is very small in practice.

The present invention has been described above with reference to a number of exemplary embodiments as shown in the drawings. Modifications and alternative implementations of some parts or elements are possible, and are included in the scope of protection as defined in the appended claims.

The invention claimed is:

1. A method for acquiring a data packet in the signal transmission, wherein the data packet comprises a preamble code followed by an access code and has a symbol period, comprising:

executing a preamble correlation continuously on a received signal using the preamble code;

determining a frequency estimate and a timing estimate from the preamble correlation;

using the frequency estimate to execute a frequency correction on the received signal;

performing an access code correlation on the frequency corrected received signal, in parallel with the continuous execution of the preamble correlation;

detecting a data packet when the access code correlation is higher than a predetermined access code threshold at an expected time relative to the timing estimate.

2. The method according to claim 1, wherein the preamble correlation is a cross-correlation.

3. The method according to claim 1, wherein the preamble correlation is an auto-correlation.

4. The method according to claim 1, wherein executing the preamble correlation comprises:

performing a peak detection;

selecting a candidate peak if the peak detection rises above a predetermined peak threshold and subsequently falls below the predetermined peak threshold within a time period of approximately one symbol period.

5. The method according to claim 1, wherein a list of candidate peaks is stored with associated timing and frequency estimates.

6. The method according to claim 5, wherein the access code correlation is executed for one or more candidate peaks in the list of candidate peaks until detection of the data packet.

7. The method according to claim 6, wherein after the data packet has been detected, synchronization is executed using the frequency estimate and the timing estimate associated with a latest peak in the list of candidate peaks.

8. The method according to claim 1, wherein the data packet is a Bluetooth data packet.

9. The method according to claim 1, wherein the access code correlation is executed using a sub-sequence part of the access code.

10. The method according to claim 9, wherein the access code has a 32 symbol length, and the sub-sequence part has a symbol length between 5 and 9 symbols.

11. The method according to claim 9, wherein the sub-sequence part has a symbol length equal to or less than the preamble code symbol length.

12. The method according to claim 9, wherein the sub-sequence part of the access code is selected to have a code separation from the preamble code higher than a predetermined first code separation threshold.

13. The method according to claim 9, wherein the sub-sequence part of the access code is selected to have a code separation from further possible sub-sequence parts of the preamble code and the access code preceding the sub-sequence part higher than a predetermined second code separation threshold.

14. The method according to claim 12, wherein the code separations for possible sub-sequence parts are calculated for a plurality of access codes and stored in a look-up table.

15. The method according to claim 9, wherein a score is attributed to possible sub-sequence part candidates by comparing a possible sub-sequence part candidate to previous bit sequences in the access code.

16. The method according to claim 15, wherein:

a sub-sequence part candidate having an identical bit sequence obtains a lowest score;

a sub-sequence part candidate having an identical bit sequence deviating only in a first or last bit obtains a second lowest score;

a sub-sequence part candidate having an identical bit sequence deviating only in a first or last two bits obtains a third lowest score;

a sub-sequence part candidate having an identical bit sequence deviating only in one bit reversal of adjacent bits obtains a fourth lowest score; and a sub-sequence part candidate having a different bit sequence from the ones above obtains a score above a score threshold value;

wherein the sub-sequence part candidate having the score above the score threshold value is selected or the sub-sequence part candidate having a highest score is selected as the sub-sequence part.

17. The method according to claim 1, wherein:

the preamble correlation is a cross-correlation or an auto-correlation; and the data packet is a Bluetooth data packet.

18. The method according to claim 12, wherein the code separation is evaluated using a cross correlation calculation.

19. The method according to claim 9, wherein:

a first score is assigned for the sub-sequence part proportional to a first code separation between the sub-sequence part and the preamble code; and a second score is assigned for the sub-sequence part proportional to a second code separation between the sub-sequence part and previous sub-sequences occurring in the access code.

20. The method according to claim 19, wherein the sub-sequence part of the access code is selected where the first score is above a predetermined first code separation threshold and the second score is above a predetermined second code separation threshold.

21. The method according to claim 13, wherein the code separations for possible sub-sequence parts are calculated for a plurality of access codes and stored in a look-up table.

22. An apparatus comprising:

a processor, which is arranged to execute an acquiring process for a data packet in a signal transmission, wherein the data packet comprises a preamble code followed by an access code and has a symbol period, the acquiring process comprising:

executing a preamble correlation continuously on a received signal using the preamble code;

determining a frequency estimate and a timing estimate from the preamble correlation;

using the frequency estimate to execute a frequency correction on the received signal;

performing an access code correlation on the frequency corrected received signal, in parallel with the continuous execution of the preamble correlation; and detecting a data packet when the access code correlation is higher than a predetermined access code threshold at an expected time relative to the timing estimate; and a receiver including receiver circuitry to receive the signal transmission, wherein the processor is connected to the receiver circuitry.

* * * * *

UNITED STATES PATENT AND TRADEMARK OFFICE
CERTIFICATE OF CORRECTION

PATENT NO. : 10,637,642 B2  
APPLICATION NO. : 16/311427  
DATED : April 28, 2020  
INVENTOR(S) : Andrew Fort Page 1 of 1

It is certified that error appears in the above-identified patent and that said Letters Patent is hereby corrected as shown below:

In the Claims

Column 10, Lines 62-63, Claim 1, replace "A method for acquiring a data packet in the signal transmission" with --A method for acquiring a data packet in a signal transmission--.

Signed and Sealed this  
Ninth Day of June, 2020

Andrei Iancu  
*Director of the United States Patent and Trademark Office*